(12) United States Patent
Culver et al.

(10) Patent No.: US 6,393,708 B1
(45) Date of Patent: May 28, 2002

(54) METHOD AND APPARATUS FOR PROVIDING ALIGNMENT PARTICULARLY IN CONSTRUCTION TASKS

(76) Inventors: Timothy James Culver, 2896 Freedom Blvd., Watsonville, CA (US) 95076; Brian Paul Goodman, 2755 Summerland Rd., Aromas, CA (US) 95004

( * ) Notice: Subject to any disclaimer, the term of this patent is extended or adjusted under 35 U.S.C. 154(b) by 62 days.

(21) Appl. No.: 09/631,905

(22) Filed: Aug. 4, 2000

(51) Int. Cl.[7] .................................................. G01C 9/14
(52) U.S. Cl. ............................ 33/397; 33/227; 33/286; 33/DIG. 21
(58) Field of Search .......................... 33/227, 262, 263, 33/333, 391, 392, 397, 529, DIG. 21, 286, 283

(56) References Cited

U.S. PATENT DOCUMENTS

| | | | | |
|---|---|---|---|---|
| 4,206,550 A | * | 6/1980 | Boyett et al. | 33/227 |
| 5,012,585 A | * | 5/1991 | DiMaggio | 33/227 |
| 5,537,205 A | * | 7/1996 | Costa et al. | 33/227 |
| 5,572,796 A | * | 11/1996 | Breda | 33/286 |
| 5,644,850 A | * | 7/1997 | Costales | 33/DIG. 21 |
| 5,666,736 A | * | 9/1997 | Wen | 33/391 |
| 5,754,287 A | * | 5/1998 | Clarke | 33/227 |
| 6,101,728 A | * | 8/2000 | Keng | 33/DIG. 21 |
| 6,124,935 A | * | 9/2000 | Matthews | 33/286 |
| 6,202,313 B1 | * | 3/2001 | Yamashita | 33/392 |

* cited by examiner

*Primary Examiner*—G. Bradley Bennett
(74) *Attorney, Agent, or Firm*—Donald P. Boys; Central Coast Patent Agency, Inc.

(57) ABSTRACT

A projection apparatus for projecting the axis of a plumbing fixture or an existing opening in a construction member onto a remote member, for locating an opening to be made in the remote member, has a body having at least a first cylindrical portion with a first diameter ending in a shoulder, the first cylindrical portion having an axis, and a laser pointer constrained in a cavity of the body such that the laser, when activated, projects along the axis. The apparatus is useful for projecting a center point from a plumbing fixture onto a remote member, such as for vent installation, and for aligning openings in construction members for pipes and other conduits. In an alternative embodiment the projection apparatus has a vertical-seeking element associated with the laser pointer, so a vertical line may be determined for an upward-facing open pipe that does not point perfectly vertical, but faces generally upward.

13 Claims, 14 Drawing Sheets

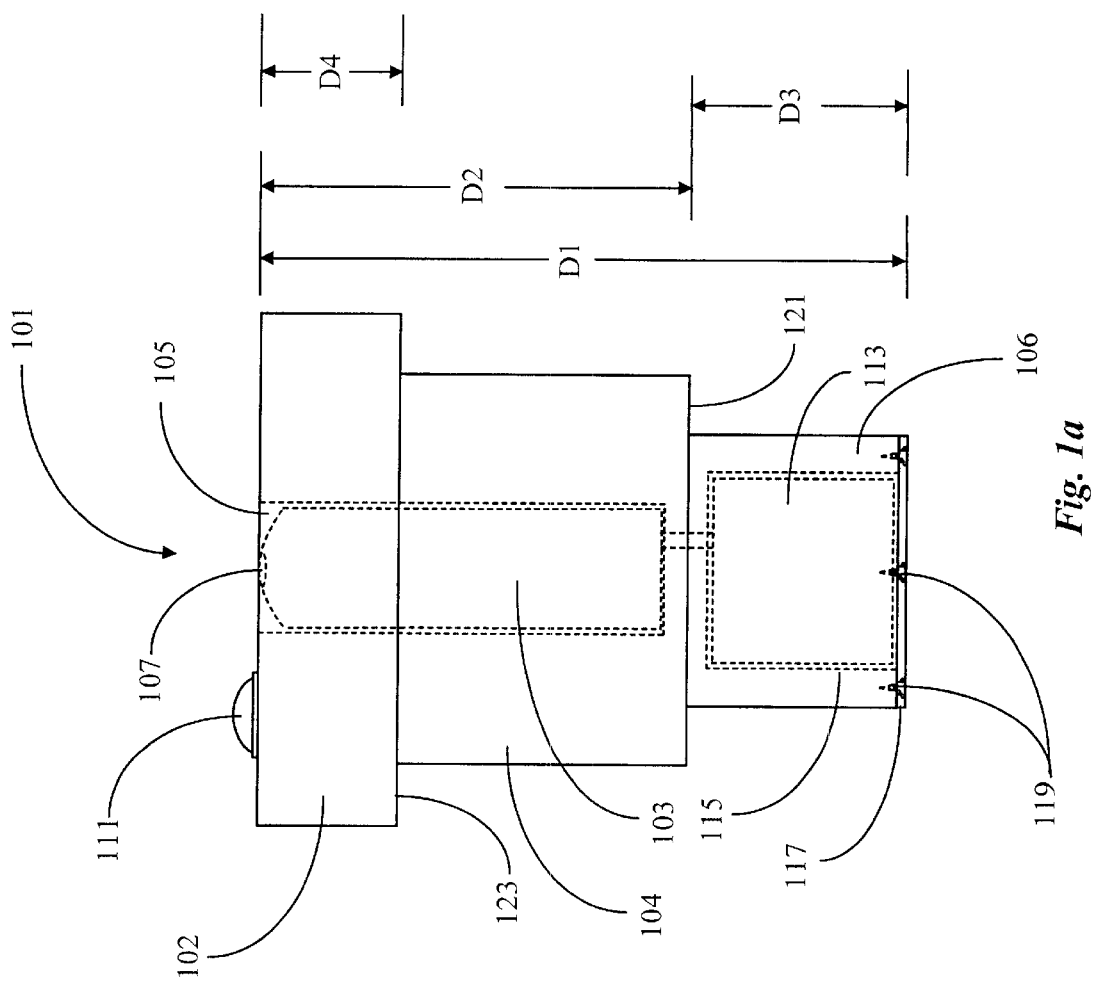

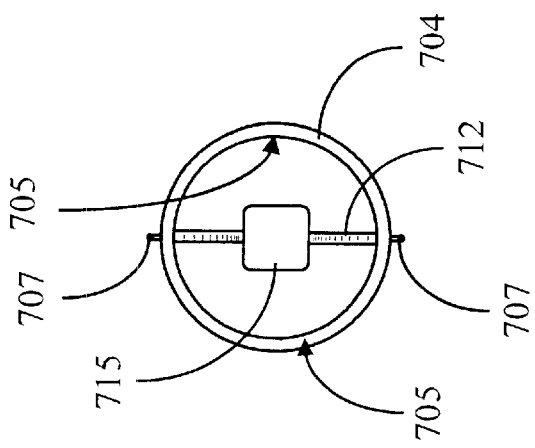
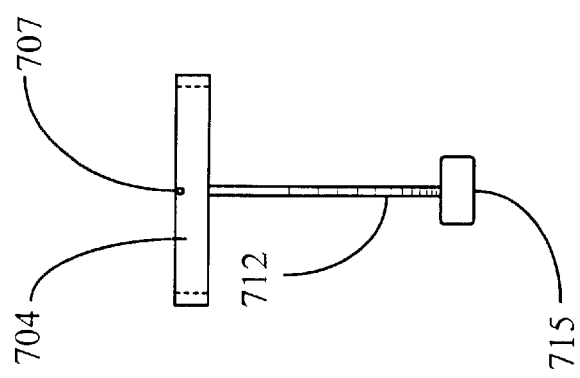
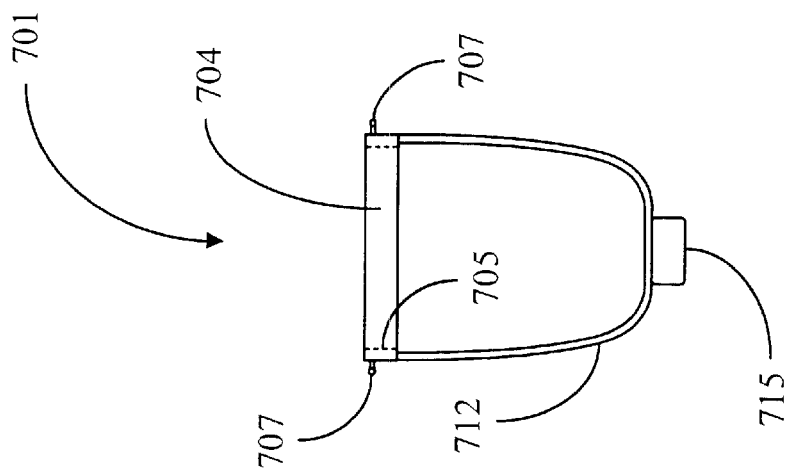
*Fig. 7c*
*Fig. 7b*
*Fig. 7a*

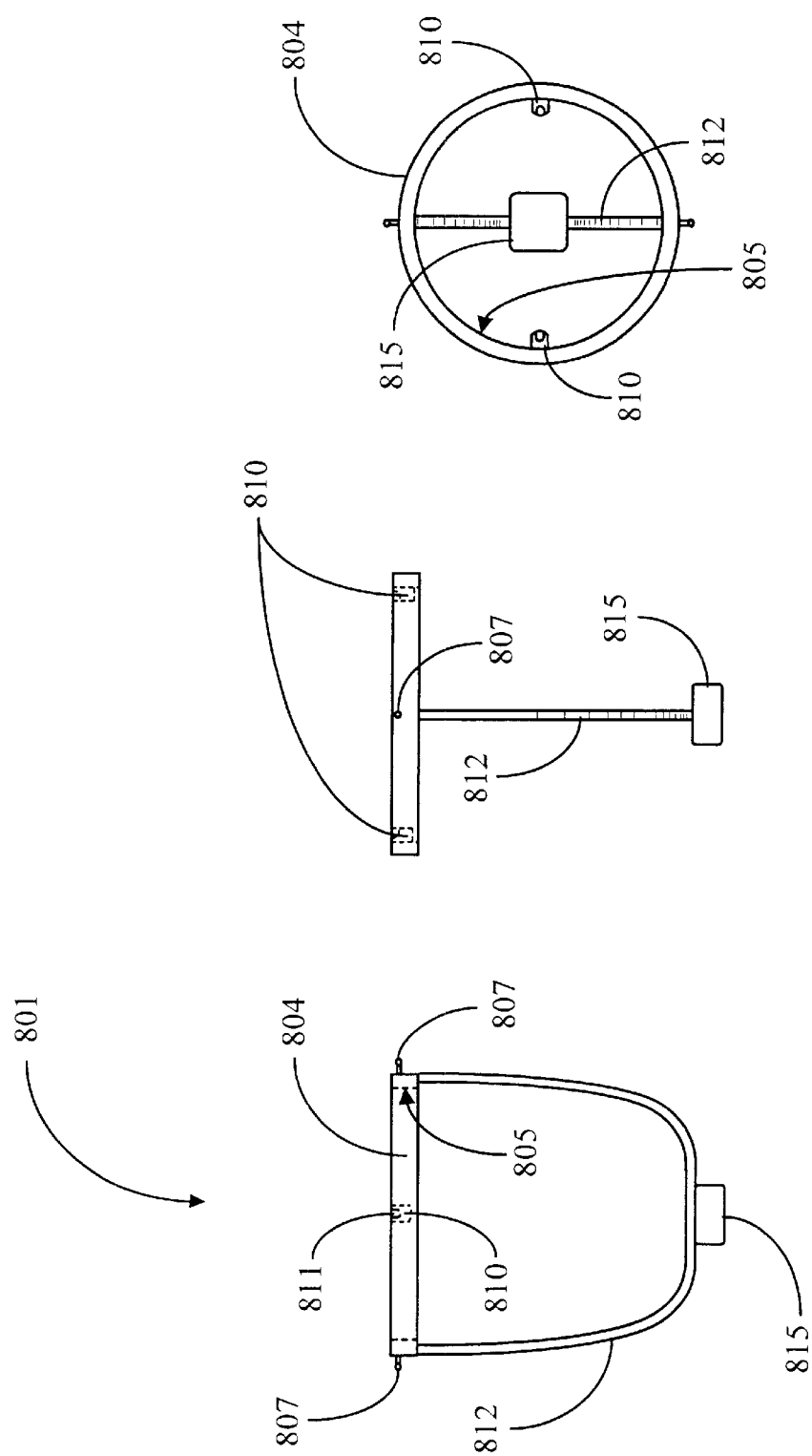

METHOD AND APPARATUS FOR PROVIDING ALIGNMENT PARTICULARLY IN CONSTRUCTION TASKS

FIELD OF THE INVENTION

The present invention is in the field of hand-held plumbing tools, and has particular application in providing an improved method and apparatus for projecting a center point from one surface to another for providing alignment.

BACKGROUND OF THE INVENTION

The construction of a new home or other building that is to have running water and or sewage fixtures, or the remodeling of an existing structure where an additional fixture will be installed for water or sewage, requires installation of all the various pipes necessary to carry water from the water supply to the fixtures, and subsequently drain the used water from the fixtures, as well as vent lines and pipes from waste apparatus. The matter of containing and controlling the water supply as it flows through the home or other structure is known in the art as plumbing. In a typical plumbing configuration for a home for example, pressurized water enters the home through a main supply line, usually passing through a water meter, and a portion of the incoming water is then branched off to enter a water heater. The heated water and remaining cold water are then piped to the various fixtures throughout the home. For each fixture within the home to which there is a water supply there must also be water drainage. The used cold or hot water, once passing through the fixture is typically drained into drainage pipes below the fixture, first passing through an S-shaped portion of pipe known as a trap that prevents sewer gas from drifting up through the drain. The used water than drains down, flowing by gravity, into the final sewer line where it is carried away from the home.

The drainage pipe attached to each fixture within the home or other structure must also be connected to a ventilation pipe in order to draw air from outside the home or structure to allow for proper gravity-fed drainage of the used water. In a typical plumbing configuration ventilation pipes for several fixtures are interconnected through an array of pipes to a main ventilation pipe, known in the art as a waste and vent stack. The waste and vent stack, connected to the main sewer line, usually extends from below ground level, vertically up through the structure and ultimately through a hole cut in the roof. In the case of buildings or structures with multiple floor levels, it is necessary for the waste and vent stack contained within or behind the walls, to first pass through the floor of each level, up through holes cut into the flooring material and horizontal members of the wooden framing, ultimately passing up through the roof of the structure. The portion of the waste and vent stack that penetrates the roof is known as a roof vent and can be fitted with an air filter, screen, rain shield or some other attachment.

In most buildings with running water all of the pipes used to carry water into, through, and away from the building are contained within the framework of the structure, and have a need to run in a vertical or horizontal direction in relation to the framework. The pipes are contained within the framework so that when sheet rock or other wall-covering material is applied to the framework to create walls, the plumbing pipes are hidden within the covered walls and away from view. For a drainage pipe running in a horizontal direction a slope rate, typically ⅛ inch or ¼ inch for each foot of the pipe's length is incorporated to allow for gravity flow of the drainage water. Vertical vent, supply and drainage pipes typically have no slope rate and run within the walls parallel to the vertical members of the framework.

A plumber in conventional art is faced with a cumbersome task when attempting to determine the center point of the holes to be drilled in the framework and other materials of a structure to accommodate all of the various pipes involved. A plumber is required to manually transpose the position of a center point of a fixture where the waste and vent pipe begins, upward through multiple floors if needed, marking the, center point of the new location and making the hole through each surface. In the case of a residential structure the last horizontal portion of framework that a waste and vent pipe needs to travel through before reaching the roof is known in the art as a top-plate, and the plumbing phase that involves marking and cutting the necessary holes and extending the waste and vent pipe up through the top-plate, extending the pipe through the roof is known in the art as the top-out phase. In order to accurately place the center point for holes to be drilled or cut into members of the framework and the roof during the top-out phase, a plumber needs to first determine the center point of the line that the ventilation pipe will follow, the center point of a hole already cut into the top-plate for example, then gain access to the attic using a ladder or some other object. A plumber then needs to hold a plumb line, which is a cord or string with a lead bob or some other weighted material attached to the other end, to the underside of the roof where the new hole is to be drilled or cut in order to determine perpendicularity between the reference center point in the top-plate and the center point of the new hole to be drilled or cut into the roof.

When working with vertical drainage or vent pipes, particularly the repair or replacement of existing pipes or fixtures, the starting center point for a vertical line to be projected is typically the center of the insertion hole of a plumbing fixture, such as an elbow section for example, into which the threaded end of a newly installed vertical pipe will be inserted. A problem often encountered when plumbing vertical pipes is the top horizontal edge of the insertion hole of a plumbing fixture such as described is not always exactly perpendicular in relation to the desired vertical line to be projected. For example, to avoid installing a vertical pipe at an undesirable angle, a plumber is required to compensate for the undesirable angle of the plumbing fixture used as the starting reference point. In this example the starting reference point is the center point of the insertion hole into which a vertical pipe will be installed. After manually projecting the desired vertical line from the center point utilizing methods previously described, a plumber must then detach the fixture from any other pipes it may be attached to, correct the undesirable angle by changing the angle of the fixture or attached pipes, and then reattach the fixture at the correct angle so as to allow for the installation of the vertical pipe which follows the desired vertical projected line.

A plumber is also required to make holes through the framework of a structure to accommodate all of the horizontal pipes in the plumbing configuration. Projecting the center point of a horizontal plumbing line from one surface to another where holes are to be drilled or cut is also a cumbersome and time-consuming task using conventional methods and apparatus. Since a plumb line cannot be used in this instance, the reference center point where the line begins, the center point of an existing hole or fixture for example, must be manually transposed to new surface by first taking measurements between the starting center point and nearby objects and applying those measurements to the new surface. As previously mentioned all horizontal drainage pipes require a slope to be incorporated into the horizontal path they will follow, adding another complicated step and exacerbating the problem of manually transposing measurements from one surface to another. Other methods of projecting a horizontal line from one surface to another involve the use of vertical or horizontal carpenter's levels, strings, tape measures, etc., methods that are also cumbersome and time-consuming in conventional art.

The methods used to project a vertical or horizontal line from one surface to another has changed little over many years in the art of plumbing, and needs to be greatly simplified for the professional plumber or layman. Much time and money can be saved by such a process that enables a user to quickly and accurately project a center point using less time, effort and tools.

What is clearly needed is an improved method and apparatus for projecting a center point that enables the utilization of an existing common plumbing fixture or an existing hole's center point to provide a starting reference center point, and quickly and accurately projects that center point to another surface for marking. What is also clearly needed is a method and apparatus using center point projectors that compensates for undesirable slopes or angles of holes or plumbing fixtures, thus allowing for easier and more accurate projection of exactly vertical center lines from the starting reference point. Such a method and apparatus in a preferred embodiment should be compatible for use with different standard sizes of plumbing pipe fittings, pipe dimensions, as well as other tools and practices commonly known in the art. It is to these objects and others that the present invention is dedicated, and apparatus and methods are taught herein in enabling detail for accomplishing these ends.

SUMMARY OF THE INVENTION

In a preferred embodiment of the present invention, a center-point projector for determining location for alignment is provided, comprising a body having at least a first cylindrical portion with a first diameter ending in a shoulder, the first cylindrical portion having an axis; and laser pointer constrained in a cavity of the body such that the laser, when activated, projects along the axis. In some embodiments there is a switch for activating the laser pointer, and the switch may be a push-button switch, normally off. In some embodiments the switch further comprises a flexible, sealable cover.

In some embodiments there is a second cylindrical portion sharing the axis of the first cylindrical portion, the second cylindrical portion having a second diameter greater than the first diameter, which allows the device to be used with openings of differing diameters.

In another aspect of the invention, in a construction process involving plural members of an assembly, a method for projecting the axis of an opening in a first member onto a second member is provided, comprising steps of (a) positioning a laser projector having a first cylindrical portion with a first diameter ending in a shoulder, the first cylindrical portion having an axis, the laser projector having also a laser pointer constrained in a cavity of the body such that the laser, when activated, projects along the axis, into a cylindrical cavity of the first member; (b) activating the laser pointer so that the laser projects along the axis of the opening of the first member onto a remote member; and (c) marking the position of the laser projecting on the remote member.

In some embodiments of the method the first member is a plumbing fixture, and in others the first member is a construction member having a circular opening. The laser pointer may be activated by an on-off switch, which may be a push-button switch, normally off. The switch can be protected by a flexible, sealable cover.

In some embodiments the laser projector further comprises at least a second cylindrical portion sharing the axis of the first cylindrical portion, the second cylindrical portion having a second diameter greater than the first diameter, and there may be a level-indicator, with the method further comprising a step for consulting the level-indicator.

In yet another aspect of the invention a center-point projector for determining location for alignment is provided, comprising a body having at least a first cylindrical portion with a first diameter ending in a shoulder, a vertical-seeking mechanism mounted in the body, and a laser pointer mounted in the vertical-seeking mechanism. In this aspect the vertical-seeking mechanism causes the laser pointer, when activated, to seek to point vertically in the direction of action of gravity. In preferred embodiments the vertical-seeking mechanism is a weighted gimbal mechanism.

In embodiments of the invention disclosed herein in enabling detail, for the first time a projector is provided that makes the job of aligning openings in separate construction members relatively easy.

BRIEF DESCRIPTION OF THE DRAWINGS

FIG. 1a is an elevation view of a center point projector according to an embodiment of the present convention.

FIG. 1b is a bottom view of the center point projector of FIG. 1a.

FIG. 1c is a top view of the center point projector of FIG. 1a.

FIG. 6b is a top view of the gimbal base of FIG. 6a.

FIG. 7a is an elevation view of an inner gimbal ring according to an embodiment of the present invention.

FIG. 7b is an elevation view of the inner gimbal ring of FIG. 7a rotated 90 degrees.

FIG. 7c is a top view of the inner gimbal ring of FIG. 7b.

FIG. 8a is an elevation view of an outer gimbal ring according to an embodiment of the present invention.

FIG. 8b is an elevation view of the outer gimbal ring of FIG. 8a rotated 90 degrees.

FIG. 8c is a top view of the outer gimbal ring of FIG. 8b.

FIG. 9 is elevation view of the center point projector of FIG. 1a and the inner gimbal ring of FIG. 7a.

FIG. 12 is elevation view of the components of FIG. 11 assembled according to a preferred embodiment of the present invention, and the plumbing fixture of FIG. 2a.

DESCRIPTION OF THE PREFERRED EMBODIMENTS

Figure 1B:
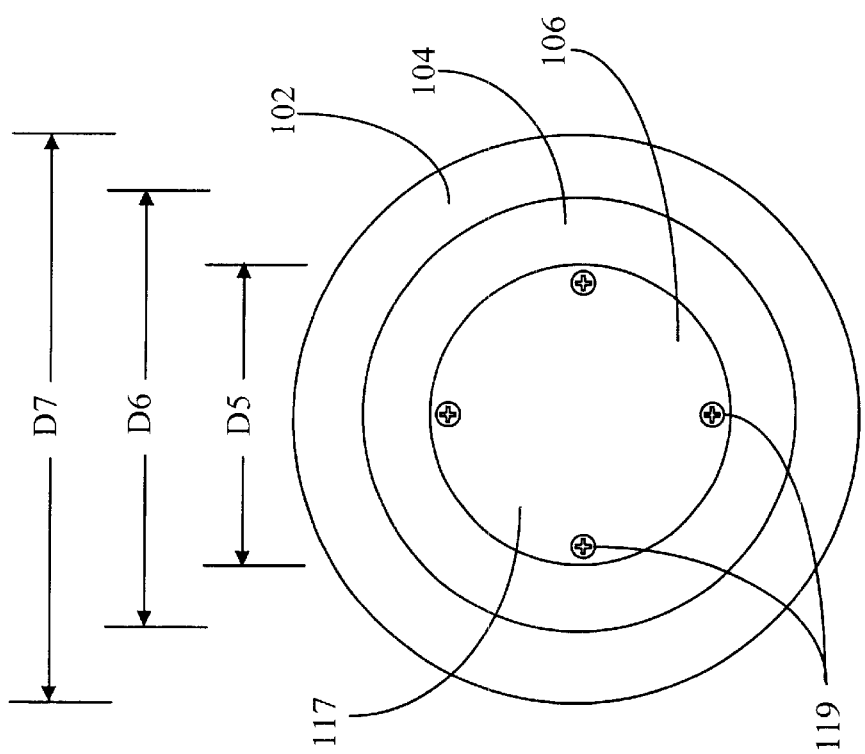

FIG. 1a is an elevation view of a center point projector according to an embodiment of the present convention. Projector 101 is provided having three portions, each cylindrical in shape and having a separate height and circumference. Cylinder 102, having the largest circumference, is positioned at the top of projector 101, cylinder 106 having the smallest circumference is positioned at the bottom of projector 101 and cylinder 104 having a circumference in between that of cylinders 102 and 106 is positioned in between cylinders 102 and 106. Shoulders 121 and 123 are provided in this embodiment by the positioning of the three separate cylinders of different circumference. The purpose of the different circumference is in positioning of cylinders 102, 104 and 106 will be explained further in greater detail. In a preferred embodiment the body of projector 101 is manufactured using a high-strength, high-impact plastic material such as ABS, but in alternative embodiments may be manufactured using a variety of materials such as wood or wood polymer, lightweight metals such as aluminum or magnesium alloy, or other material having similar strong, high-impact and resilient properties. Projector 101 has a circular hole 105 drilled, bored, or fashioned by some other means into the top center of the upper portion of projector: 101, extending down into the body of projector 101 to a depth sufficient to hold a standard laser pointer device, such as laser pointer 103, so that the top edge of such a laser pointer device when fully inserted into hole 105 is somewhat flush with the top edge of the upper portion of projector 101, and a laser beam when emitted from laser pointer 103 points directly upward in a straight line. In alternative embodiments of the present invention hole 105 can be of various depth and circumference to accommodate a variety of standard laser pointer devices. Laser pointer 103 in this embodiment has a lens 107 through which a laser beam is emitted, and is connected to and powered by a battery 113 contained within the lower portion of projector 101. In various embodiments battery 113 can be of many different types, such as rechargeable nickel-cadmium or long-life lithium types, and can be of many different shapes and sizes in alternative embodiments.

Battery compartment 115 is provided in this embodiment to contain a battery such as battery 113, being cut, bored, or fashioned by some other means into the body of the bottom portion of projector 101. Battery 113 is secured within compartment 115 by a removable battery cover plate 117 and screws 119 fastened to the bottom portion of the body of projector 101. In other embodiments battery access may be enabled by some other means such as a hinged battery door with a latch, a circular lid having threaded edges screwed into the bottom of the body of projector 101, or some other method. Laser pointer 103 in a preferred embodiment is actuated by an on-off switch 111 being of push button type and protected from the elements with a flexible rubber covering, half-spherical in shape. In other alternative embodiments however, switch 111 can be of a variety of types without departing from the overall scope and spirit of the present invention. For example, a sliding switch or toggle switch may be used, and a protective covering may or may not be used. Projector 101 has an overall height of dimension D1, equal to approximately two inches in this embodiment. The vertical height of the middle cylinder of projector 101 is represented as dimension D2, equal to approximately one inch in this embodiment. The vertical height of the lower cylinder in this embodiment is represented as dimension D3, in a preferred embodiment being no longer than ¾ inch overall. The vertical height of the upper cylinder of projector 101 represented as dimension D4 is approximately ¼ to ⅜ of an inch. All of the dimensions above can vary slightly in other embodiments, and their use and significance will be explained and depicted later in enabling detail.

FIG. 1b is a bottom view of projector 101 of FIG. 1a. In this view cover plate 117 and screws 119 can be clearly seen as can the circular shape of cylinders 102, 104 and 106. In a preferred embodiment of the present invention the bottom cylinder 106 has a diameter D5 equal to approximately 1½ inches so that when projector 101 is inserted into the opening or hub of a standard plumbing fixture having an inner diameter approximately equal to or slightly greater than that of diameter D5 a snug, but not tight fit is achieved. The middle cylinder 104 has a diameter D6 that is equal to approximately 2 inches in order to, when fully inserted into the hub of a plumbing fixture having a standard inner diameter of approximately 2 inches or slightly greater, provide a snug fit similarly to that achieved by cylinder 106. In a preferred embodiment upper cylinder 102 has a diameter D7 that is proportionately larger, in this case approximately 3 inches, than that of middle cylinder 104. Unlike the diameters of cylinders 104 and 106 in a preferred embodiment, diameter D7 of cylinder 102 can vary slightly in alternative embodiments since there is not a requirement for this cylinder to fit into any plumbing fixture or hole.

Figure 1C:
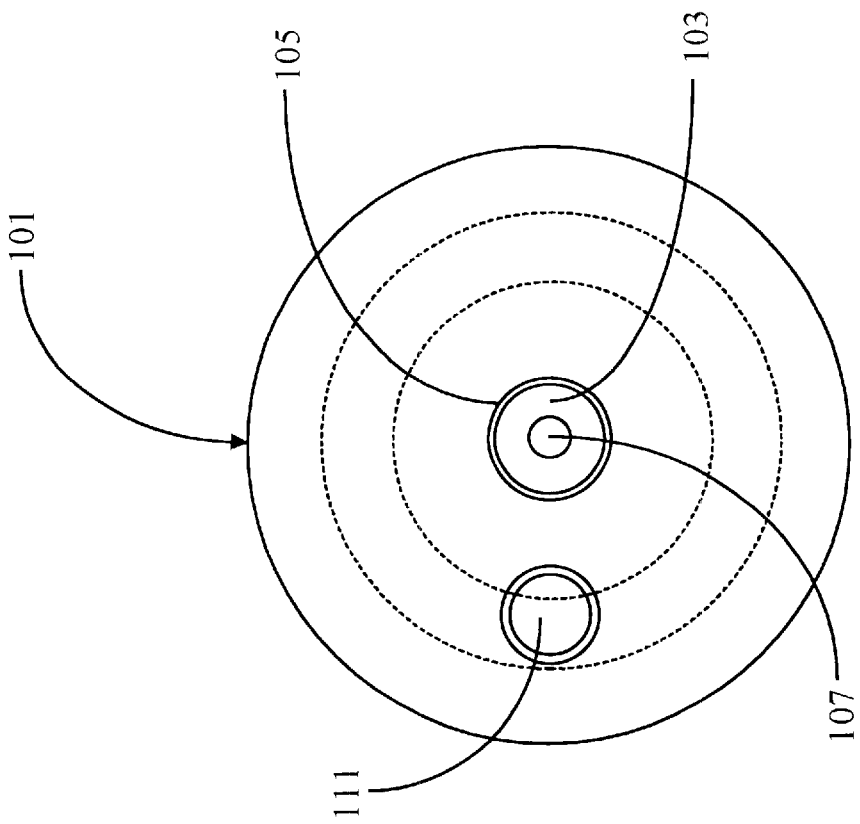

FIG. 1c is a top view of projector 101 of FIG. 1a. In this view laser pointer 103 with lens 107 can be seen seated within hole 105, as can the positioning of switch 111 in this embodiment.

Figure 2C:
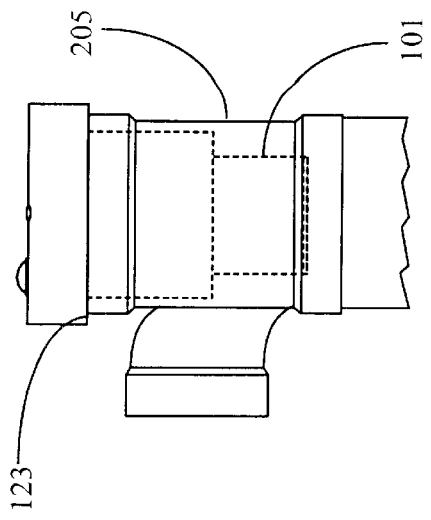
FIG. 2c is an elevation view of the center point projector of FIG. 1a fitted with another standard plumbing pipe fixture according to another embodiment of the present invention.
Figure 2B:
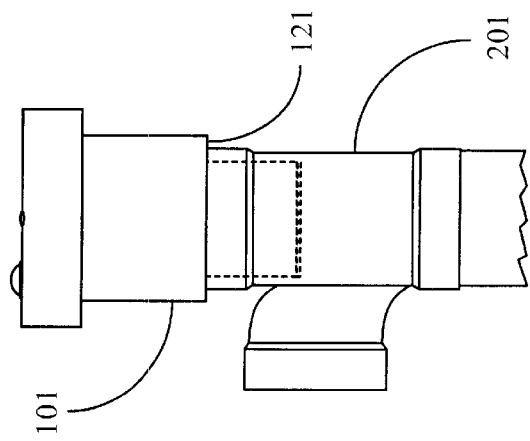
FIG. 2b is an elevation view of the components of FIG. 2a assembled according to an embodiment of the present invention.
Figure 2A:
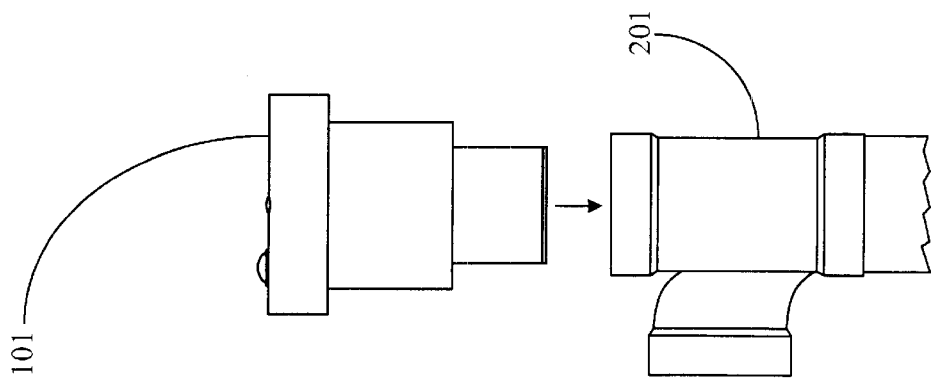
FIG. 2a is an elevation view of the center point projector of FIG. 1a and a standard plumbing pipe fixture.

FIG. 2a is an elevation view of the center point projector of FIG. 1a and a standard plumbing pipe fixture. Fixture 201 has a hub 203 with an inner diameter of approximately 1½ inches as referenced previously. When projector 101 is fully inserted down, in the direction indicated, into the opening provided by hub 203, shoulder 121 of projector 101 rests upon the upper edge of hub 203, cylinder 106 fitting snugly within the opening of hub 203. In this manner, once fully seated within fixture 201, projector 101 is positioned in line with the lengthwise orientation of fixture 201, therefore providing a means for laser pointer 103, when actuated, to project a laser beam in straight line in relation to fixture 201. The fit of the cylinder into the plumbing fixture assures that the laser beam will project substantially along the center line of the axis of the pipe of the plumbing fixture.

FIG. 2b is an elevation view of the components of FIG. 2a assembled according to an embodiment of the present invention: In this view projector 101 can be seen fully inserted into fixture 201, shoulder 121 resting upon the upper edge of hub 203 as previously described.

FIG. 2c is an elevation view of projector 101 fitted with another standard plumbing pipe fixture according to an alternative embodiment of the present invention. Projector 101 can be seen in this view fully inserted into a plumbing fixture 205, fixture 205 having a hub 206 with an inner diameter of approximately 2 inches, a diameter standard in the art. In this case, middle cylinder 104, having a greater diameter than that of cylinder 106, fits snugly within the larger hub 206 when fully inserted, shoulder 123 resting upon the upper edge of hub 206 as in FIG. 2b.

Figure 3:
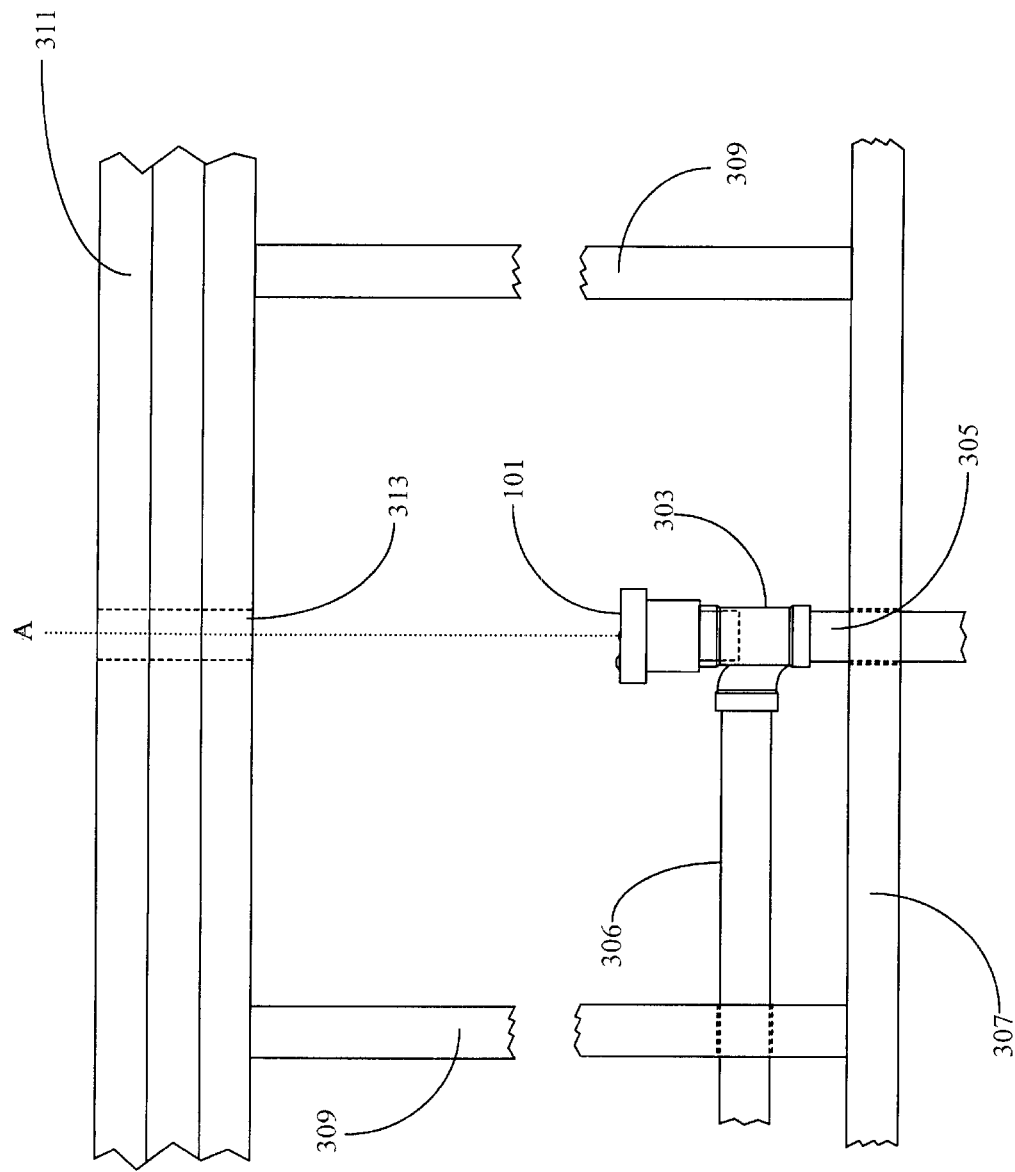
FIG. 3 is a broken view of the center point projector of FIG. 1a used in the framework of a building according to an embodiment of present invention.

FIG. 3 is a broken view showing an example of an application wherein projector 101 is used to project a center point to a new surface according to a preferred embodiment of the present invention. Projector 101 can be seen in this view inserted into standard plumbing fixture 303, fixture 303 connected to a drainage pipe 305 and a drainage pipe 306. Drainage pipe 305 can be seen extending down through a hole within horizontal framing member 307, with drainage pipe 306 extending horizontally through a hole within vertical framing member 309. As previously mentioned all drainage pipes in a standard plumbing configuration within any building supplied with running water must be ultimately connected to a vent pipe to allow outside air to be drawn into the system when drainage occurs, thus allowing for proper drainage of the used water. In order for a plumber to properly install and align a vent pipe, additional holes need to be cut or drilled through various framing members within the structure to accommodate the passage of the vent pipe, and a center point of the new hole needs to be projected from the starting reference center point and marked on the new surface, in the case of FIG. 3a top-plate 311. Line A in this view represents the center point to be projected, Line A correlating with the direction of a laser beam emitted from projector 101 once projector 101 is properly seated within fixture 303 and the laser beam is actuated. Once the center point is established on the new surface, a hole such as hole 313 can be accurately cut or drilled through the new'surface at the proper location. In the case of a residential structure the last horizontal portion of framework that a vent pipe needs to travel through before reaching the roof is known in the art as a top-plate, and the plumbing phase that involves marking and cutting the necessary holes and extending the vent pipe up through the top-plate, and ultimately through the roof is known in the art as the top-out phase.

Figure 4:
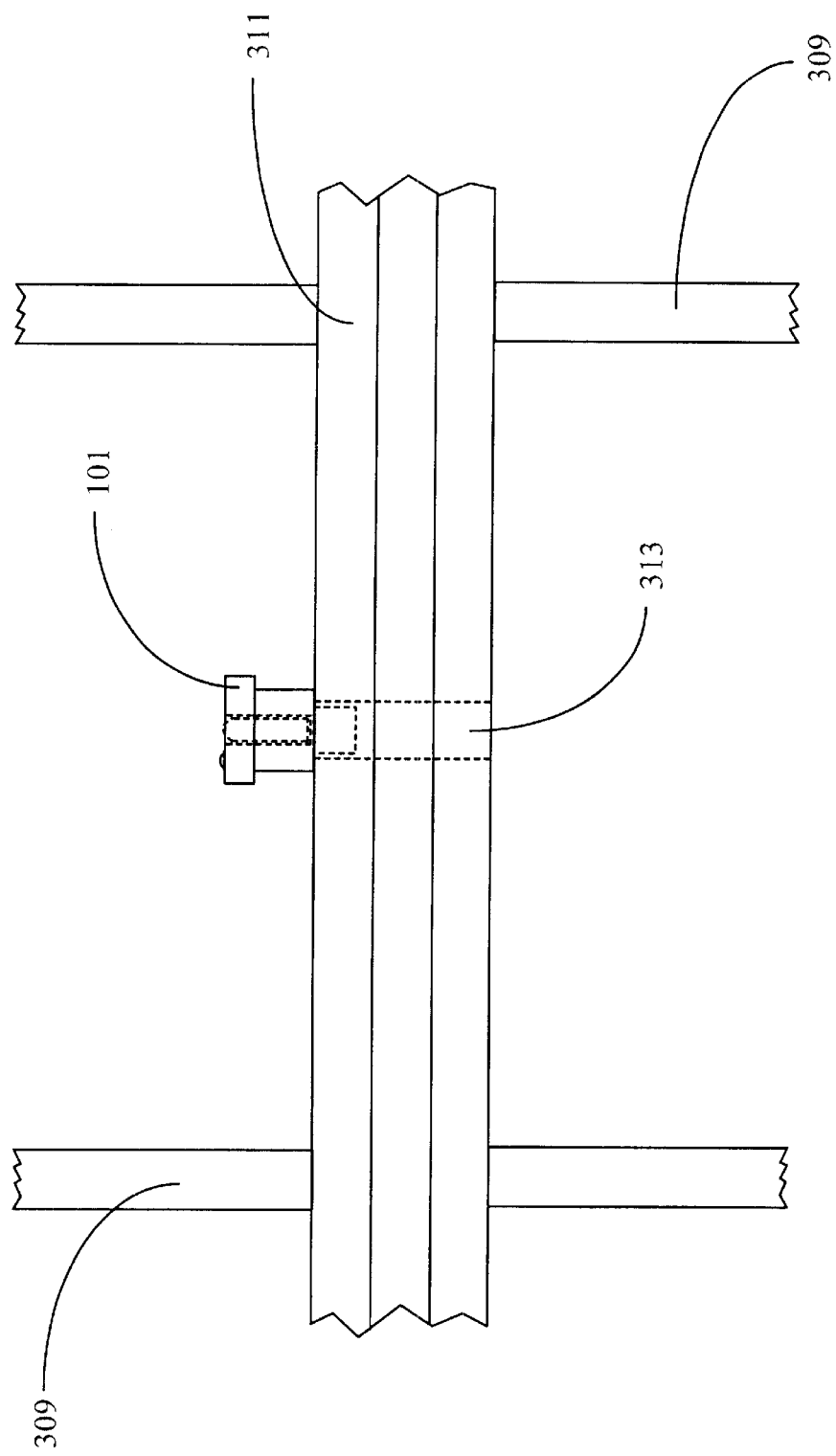
FIG. 4 is a broken view showing the center point projector of FIG. 1a inserted into a framing member according to an embodiment of the present invention.

FIG. 4 is a broken view showing projector 101 inserted into a framing member according to an embodiment of the present invention. In this view an application of the present invention during a top-out phase is shown wherein projector 101, inserted into top-plate 311 using hole 313 is in the correct position to accurately project the center point to the new surface once the laser pointer within projector 101 is actuated and the laser beam is emitted. Vertical framing members 309 are also shown in this view for reference.

Figure 5:
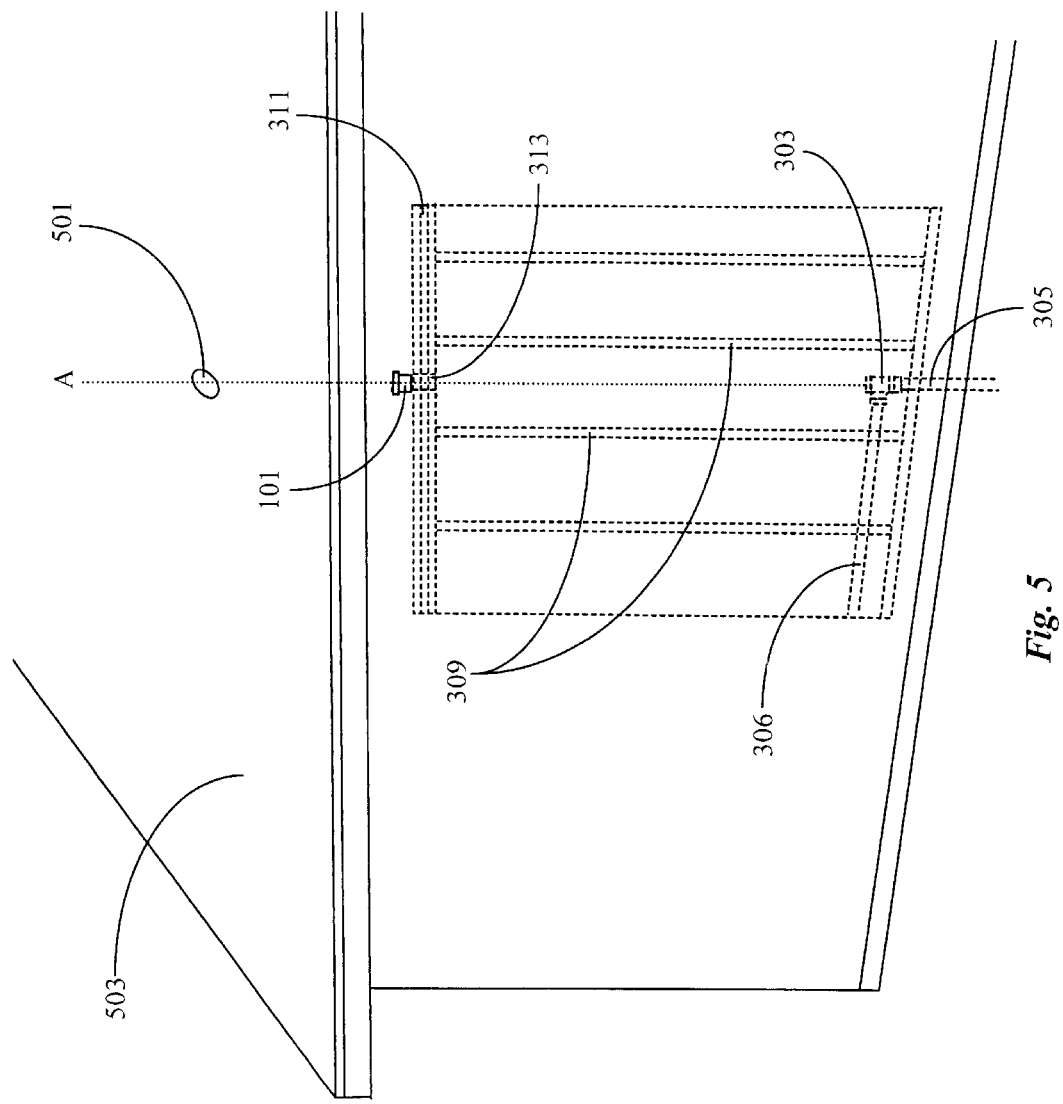
FIG. 5 is an elevation view showing an expanded application of the components of FIG. 3 used according to a preferred embodiment of the present invention.

FIG. 5 is an elevation view showing an additional application of the components of FIG. 3 used according to a preferred embodiment of the present invention. Plumbing fixture 303 can be seen connected to drainage pipes 305 and 306 running both horizontally and vertically. Line A, in this view, is shown as it was projected by projector 101 from the original starting reference point as in FIG. 3. Aligned with line A, projector 101 in this embodiment is now inserted into hole 313 of top-plate 31 and fully seated as previously described. Once the laser beam is actuated and emitted from projector 101 within hole 313, the new center point for hole 501 in roof 503 can be marked for drilling or cutting, thus eliminating the cumbersome process of projecting this new hole using conventional methods as previously described.

A projector such as projector 101 can be used to project a center point either vertically or horizontally using the same methods as previously described for a preferred embodiment. In an alternative embodiment of the present invention, in order to accurately project a line allowing for a gradual slope such as for a horizontal drainage pipe as previously mentioned, a center point projector may have a built-in level or some other integrated method and apparatus to project such a sloped line. In another alternative embodiment a center point projector may have a sonar system or some other similar apparatus integrated within to allow the user to easily determine the distance between the starting reference center point and the new surface onto which the new projected center point will be marked. In yet another alternative embodiment of present invention a center point projector may have an apparatus allowing a user to attach the projector to a board, truss, plank or some other surface to allow drilling of consecutive or parallel boards. Such an apparatus may incorporate the use of a standard screw, nut and bolt or some other fastening device. In other alternative embodiments the diameters of the cylinder portions of a projector such as projector 101 can vary slightly without departing from the scope and spirit of the invention. It is the purpose of these diameters to allow for fitting of the projector snugly into the all of the standard dimensions of common pipe fixtures and holes used for the passage of plumbing pipes of standard circumference known in the art, so that when fully inserted the laser beam emitted from the projector is aligned as desired.

Figure 6B:
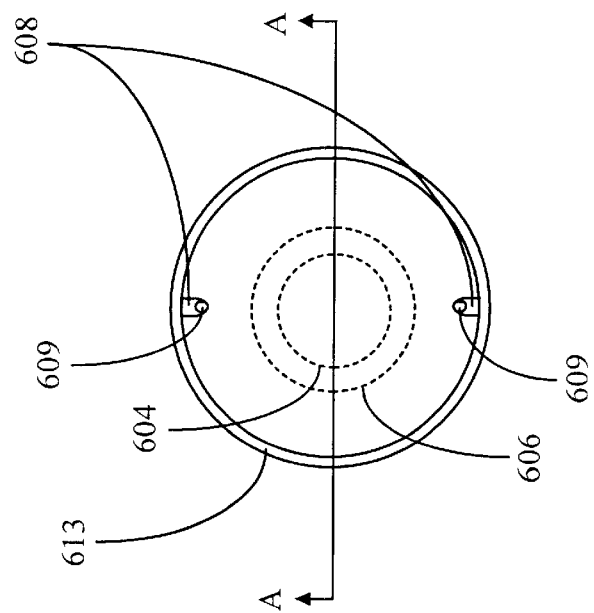
Figure 6A:
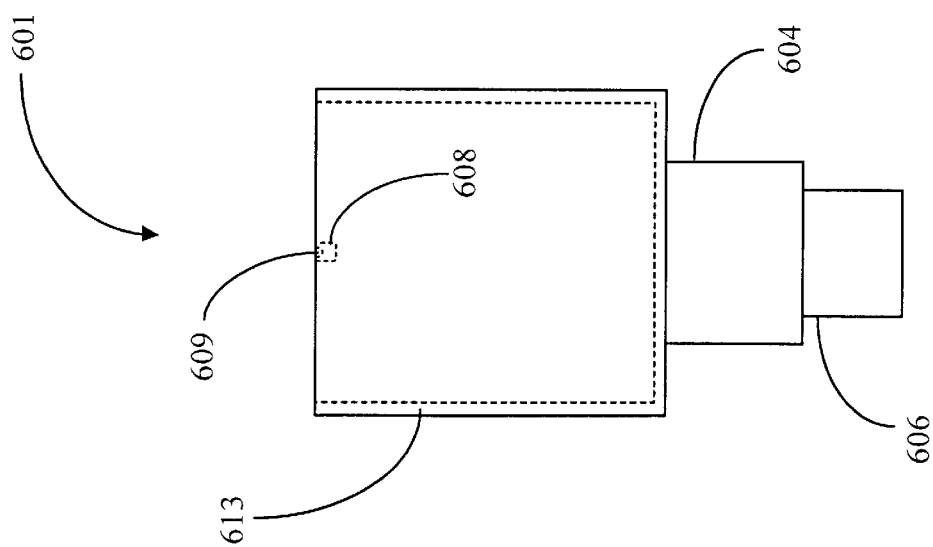
FIG. 6a is elevation view of a gimbal base according to an embodiment of the present invention.

FIG. 6a is elevation view of gimbal base according to an embodiment of the present invention. Gimbal base 601 is provided having an upper portion 613 of a cylindrical shape similar to that of a cup or drinking glass, with a vertical rigid wall encompassing a cylindrical void within. Gimbal base 601 in a preferred embodiment is manufactured of a light weight, rigid material such as high-impact plastic or a metal alloy for example, and can be made using a variety of manufacturing methods. Protrusions 608, only one of which is shown in this view, are provided in this embodiment located slightly under the upper rim of upper portion 613, extending outward from the inner wall of upper portion 613. Protrusions 608 are located at exact opposite points on the circumference of upper portion 613. Protrusions 608 can be attached or formed into the inner wall of upper portion 613 by welding, bonding, molding, or a variety of other methods known in the art.

Each of protrusions 608 has a small, concave recess 609 formed into the upper surface near the edge facing inward. Cylinder 604 and cylinder 606 can be seen in this view extending downward from the underside of upper portion 613 and in a center location. The radius of cylinders 604 and 606 in this embodiment is equal to that of cylinders 104 and 106 respectively, of center point projector 101 of FIG. 1a. The height of cylinders 604 and 606 in this embodiment is also roughly equal to the cylinders of center point projector 101 of FIG. 1a, but can vary in other embodiments. The radius of cylinders 604 in 606, as well as those of cylinders 104 and 106 or those of other preferred embodiments, have been determined by the inventors, as previously mentioned, to be compatible with diameter dimensions standard in the industry allowing for a snug fit when inserted into a hole or opening of a plumbing fixture.

FIG. 6b is a top view of gimbal base 601 of FIG. 6a. The cylindrical shape of upper portion 613 and cylinders 604 and 606 can be better seen in this view, as can the placement of protrusions 608 in relation to each other, and the location of recesses 609 within upper surfaces of protrusions 608.

FIG. 7a is an elevation view of an inner gimbal ring according to an embodiment of the present invention. Inner gimbal ring 701 is provided in this embodiment having a ring-shaped upper portion 704 with the inner edge having a radius nearly equal to but slightly larger than that of cylinder 104 of center point projector 101 of FIG. 1a. Upper portion 704 is designed providing a snug but not tight fit when center point projector 101 is inserted down through upper portion 704 to the resting position. A hidden line indicating the inner wall of ring 704 can be seen in this view illustrating the somewhat narrow thickness of the ring-shaped upper portion 704. Pins 707, extending slightly outward from the outer edge of upper portion 704 have a spherical tip on the outer end of each, and are located 180 degrees opposite to each other similarly to protrusions 608 of FIG. 6b.

In various embodiments of the present invention pins 707 may be screwed into a threaded hole drilled or bored into the outer edge of upper portion 704, having a threaded self-tapping tip for example, or may be inserted into a pre-drilled hole similar to a dowel and spot welded or secured by some other means that allows secured pins 707 to have collective rigidity to independently support the entire weight of gimbal ring 701. Supports 712, each side secured to the underside of upper portion 704 and located 180 degrees opposite each other directly below pins 707, extend downward and curve inward towards each other eventually meeting at the center. A weight 715 is attached to the underside of support 712 and, in a preferred embodiment is of a magnitude significantly greater than that of the combined weight of the remaining components of inner gimbal ring 701. Weight 715 is square shaped and of lesser height than width in this embodiment, but in alternative embodiments the size, shape, weight, or method of attachment of a weight such as weight 715 can vary significantly, as can the various attributes of a support such as support 712 such as the curvature the lower end for the method of attachment to upper portion 704.

It is an object of the invention as depicted in embodiments described herein, to have a weight such as weight 715 heavy enough in relation to the combined weight of the remaining components of inner ring 701 and positioned low enough in relation to the pivot points of pins 707, so that when a weight equal to that of center point projector 101 of FIG. 1a is added to the overall weight of inner ring 701 a vertical position is maintained by the heavier bottom weight 715 and its low center of gravity, when all of the components are supported only by the spherical tips of pins 707. For reasons stated the type and size of weights used as well as the type of weight support mechanism utilized can vary in different embodiments without departing from the scope and spirit of the present invention. As is true for components previously described the materials and methods used in the composition of, or manufacture of new embodiments described herein may also vary in different alternative embodiments.

FIG. 7b is elevation view of inner gimbal ring 701 of FIG. 7a rotated 90 degrees. In this view the thickness of supports 712 can be seen and a direct view of pin 707 is provided.

FIG. 7c is a top view of inner gimbal ring 701 of FIG. 7b. Inner wall 705 can be clearly seen here as can the ring-like shape of upper portion 704 and the square shape of weight 715 in its centered position. The two sides of supports 712 are again depicted in this view to illustrate their alignment with pins 707 and weight 115.

FIG. 8a is an elevation view of an outer gimbal ring according to an embodiment of the present invention. Outer gimbal ring 801 is provided in this embodiment as being similar in basic shape to inner gimbal ring 701 of FIG. 7a. Upper portion 804 is provided having a ring-like shape also similar to that of upper portion 704 of inner gimbal ring 701, but having a diameter slightly larger than upper portion 704. Pins 807, identical to pins 707 of FIG. 7a are also located in a similar position 180 degrees opposite from each other and attached to upper portion 804 using means and method similar to those of pins 707 of FIG. 7a. Support 812 has two sides extending down from upper portion 804, curving inward and connected at the bottom with a weight 815 attached, attributes also similar to inner gimbal ring 701. Being similar in overall structure and having similar physical properties to inner gimbal ring 701, the relationship between the total weight of the components of outer gimbal ring 801, and that of weight 815 is also similar therefore providing similar preferred actions where carrying significant additional weight while being suspended solely by pins 807. The significance of these relationships will become more apparent as explained and depicted later in greater enabling detail. Protrusions 810 are provided in this embodiment identical to protrusions 608 of gimbal base 601 of FIG. 6a, and are attached to inner wall 805 using various means and methods previously described. Protrusions 810 are also located on inner wall 805 in 180 degrees opposite position similar to protrusions 608 of gimbal base 601. Recesses 811 are also provided being identical to recesses 609 of FIG. 6a.

FIG. 8b is an elevation view of outer gimbal ring 801 of FIG. 8a rotated 90 degrees. In this view the thickness of supports. 812 can be seen and a direct view of pin 807 is provided.

FIG. 8c is a top view of outer gimbal ring 801 of FIG. 8b. Inner wall 805 can be clearly seen here as can the ring-like shape of upper portion 804 and the square shape of weight 815 and its centered position in relation to upper portion 804. An improved view of protrusions 810 extending out from inner wall 805, with concave recesses 811 on their upper surface, is also provided here. The two sides of supports 712 are again depicted in this view to illustrate their alignment with pins 807 and weight 815 in identical fashion to that of inner gimbal ring 701 of FIG. 7a.

Figure 9:
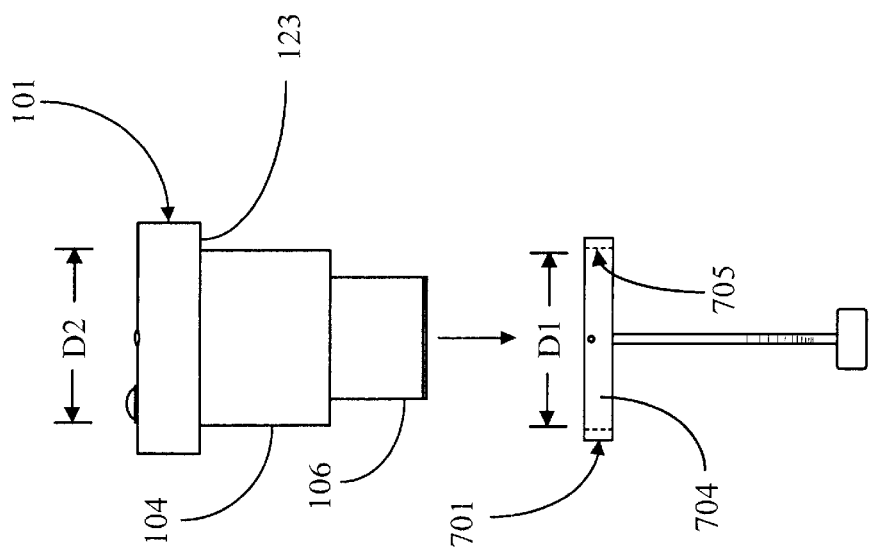

FIG. 9 is elevation view of center point projector 101 of FIG. 1a and inner gimbal ring 701 of FIG. 7a. As previously described, the radius of inner wall 705, referenced in this embodiment as been dimension D1, of upper portion 704 is slightly larger, approximately ¹⁄₆₄ inch in a preferred embodiment, than a radius of cylinder 104, referenced as dimension D2, of center point projector 101. The difference in dimensions D1 and D2 previously referenced as ¹⁄₆₄ inch is somewhat arbitrary and can vary slightly in alternative embodiments. Inner gimbal ring 701 is designed as a resting base for center point projector 101 inserted in the downward direction as indicated completely through ring-shape upper portion 704, surface 123 of center point projector 101 coming to rest upon the upper surface of upper portion 704. It is the intention of the design of inner gimbal ring 701 to allow a user to easily slide a center point projector such as center point projector 101 in and out of the upper portion 704 of inner gimbal ring 701 while maintaining a somewhat snug fit when a center point projector is fully inserted, thus stabilizing the center point projector in its seated position.

Figure 10:
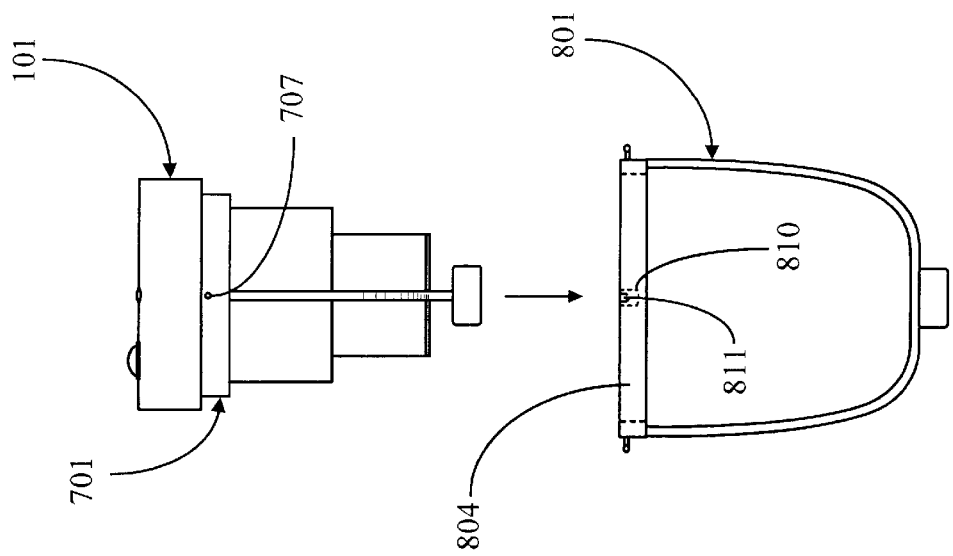
FIG. 10. is elevation view of the assembled center point projector and inner gimbal ring of FIG. 9 and the outer gimbal ring of FIG. 8a according to an embodiment of the present invention.

FIG. 10 is elevation view of assembled center point projector 101 and inner gimbal ring 701 of FIG. 9 and the outer gimbal ring of FIG. 8a according to an embodiment of the present invention. In this embodiment the distance between the centers of the spherical tips of pins 707 is identical to the distance between the centers of the concave recesses 811 of protrusions 810. Center point projector 101, inserted and fully seated within inner gimbal ring 701 according to a preferred embodiment, is lowered downward as an assembly in the direction indicated, through upper portion 804 of outer gimbal ring 801 until both spherical tips of pins 707 of inner gimbal ring 701 rest neatly within the concave recesses 811 regions 810 of upper portion 804. The combined weight of seated center point projector 101 and inner gimbal ring 701 is supported solely by the spherical tips of pins 707 seated within recesses 811, providing a pivot point allowing the assembled center point projector 101 and inner gimbal ring 701 to swing freely from side to side.

Figure 11:
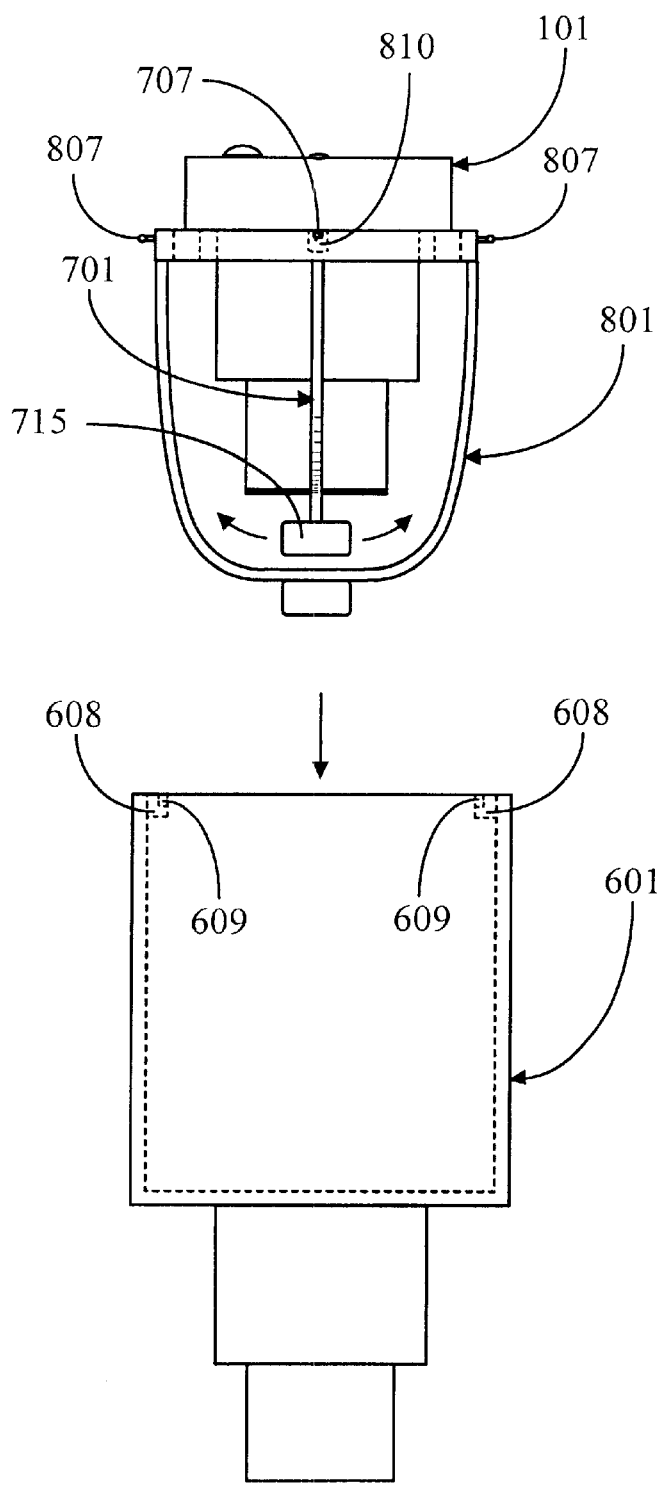
FIG. 11 is an elevation view of the components of FIG. 10 assembled according to a preferred embodiment of the present invention, and gimbal base 601 of FIG. 6a rotated 90 degrees.

FIG. 11 is an elevation view of the components of FIG. 10 assembled according to a preferred embodiment of the present invention, and gimbal base 601 of FIG. 6a rotated 90 degrees. As shown here, center point projector 101 is firmly seated within inner gimbal ring 701, the assembly supported by the spherical tips of pins 707 of inner gimbal ring 701 well resting within recesses of protrusions 810 of outer gimbal ring 801. As described earlier and more clearly seen here, the assembled center point projector 101 and inner gimbal ring 701 is allowed by its design to swing freely side to side, but maintains a perfectly vertical position within outer gimbal ring 801 when motion subsides and the effect of gravity acts upon weight 715 of inner gimbal ring 701. As is true with pins 707 of inner gimbal ring 701 and notches 811 of outer gimbal ring 801, the distance between the center points of the spherical tips of pins 807 and the concave recesses 608 of protrusions 609 of gimbal base 601 are exactly identical. The assembled outer gimbal ring 801, inner gimbal ring 701 and seated center point projector 101 is by design able to be lowered down into the cylindrical void within gimbal base 601, supported fully by only the spherical tips of pins 807 resting within recesses 609, with sufficient room within gimbal base 601 to allow for substantial front to back movement pivoting on pins 807.

Figure 12:
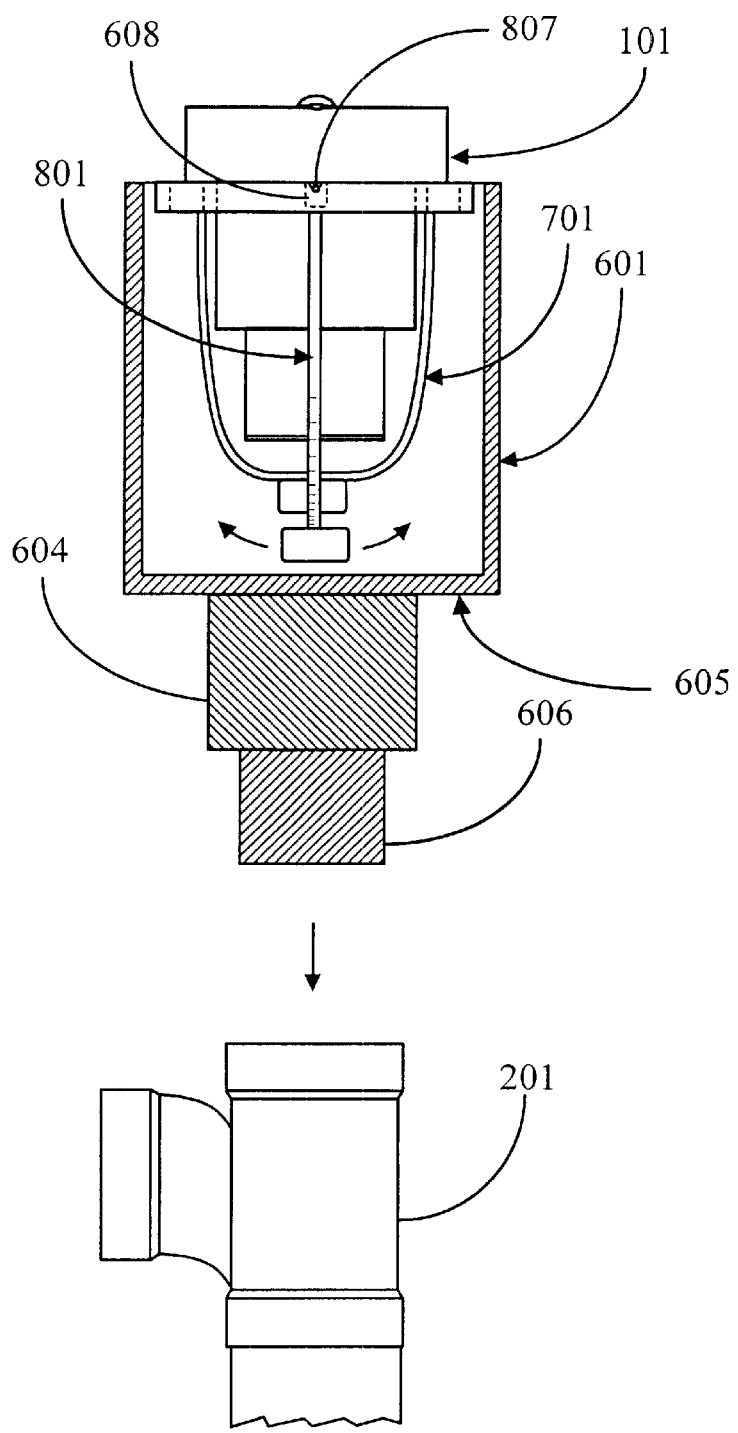

FIG. 12 is elevation view of the components of FIG. 11 assembled according to a preferred embodiment of the present invention, and the plumbing fixture of FIG. 2a. A section view of gimbal base 601, taken along section line A—A of FIG. 6b, is provided to enable a better view of the assembled components within. Gimbal base 601 is shown in this view rotated 90 degrees from its position in FIG. 11 providing a direct view of protrusions 608 and pins 807, on which the combined weight of center point projector 101, inner gimbal ring 701 and outer gimbal ring 801 is supported. Center point projector 101, when seated within inner gimbal ring 701 and pivoting within outer gimbal ring 801 is allowed free movement in any direction when lowered into gimbal base 601, supported by and pivoting on pins 807 resting upon protrusions 608 of gimbal base 601. Plumbing fixture 201 of FIG. 2a, into which the gimbal assembly is lowered as indicated, is shown here for the purpose of illustrating a starting reference point from which a vertical line will be projected in a preferred embodiment of present invention.

The design and dimensions of cylinders 604 and 606, similar to those of center point projector 101 of FIG. 1a as previously described, enable a secure fit into the opening of a standard plumbing fixture such as fixture 201, bottom surface 605 resting upon the upper edge of the opening of fixture 201. Alternative embodiments however may provide a gimbal base with cylinders of different sizes to accommodate a variety of applications and different sizes of holes or plumbing fixture openings. In other alternative embodiments a gimbal base may be provided with removable and interchangeable cylinders which may be attached to the bottom of the gimbal base using a variety of methods, allowing a user to quickly and easily adapt to different situations requiring vertical lines to be projected from holes or plumbing fixtures of varying dimensions.

Figure 13:
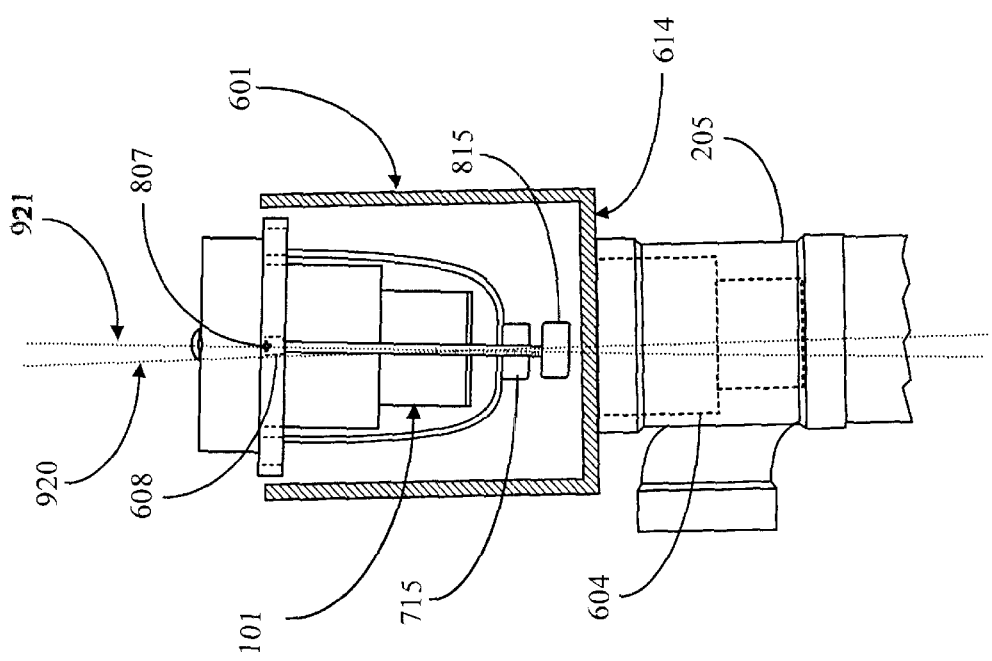
FIG. 13 is an elevation view of plumbing fixture 205 of FIG. 2c, and a gimbal assembly with center point projector 101 of FIG. 1a according to another embodiment of the present invention.

FIG. 13 is an elevation view of plumbing fixture 205 of FIG. 2c, and a gimbal assembly with center point projector 101 of FIG. 1a according to another embodiment of the present invention. Plumbing fixture 205 of FIG. 2a, into which the gimbal assembly is fully inserted suspending a freely moving center point projector 101, is shown for the purpose of illustrating a starting reference point from which a vertical line will be projected in a preferred embodiment of present invention. As previously described plumbing fixture 205 has an opening of a larger size, standard in the industry, than that of plumbing fixture 201 of FIG. 12. A secure fit between the gimbal assembly and opening of plumbing fixture 205 is provided by the larger cylinder 604, being the cylinder now used for insertion into the opening, surface 614 resting upon the top edge of plumbing fixture 205. Plumbing fixture 205 the shown in this view tilted approximately two degrees counterclockwise, the center line represented as line 920, to illustrate in enabling detail an application of a preferred embodiment with the intention of projecting a vertical center line from the opening of a plumbing fixture that is slightly off angle. With gimbal base 601 fully seated within and aligned with plumbing fixture 205, the vertical center line can be projected with the fully'seated center point projector 101, the vertical line represented as line 921 in this view, by the centering actions of weights 715 and 815 of the freely pivoting inner and outer gimbal rings.

It will be apparent to a person of ordinary skill that there are many alterations that may be made in the embodiments described herein without departing from the overall spirit and scope of the present invention. For these reasons the invention should be afforded the broadest possible scope limited only by the language of the claims that follow.

What is claimed is:

1. A center-point projector for determining location for alignment, comprising:
    a body having first, second and third cylindrical portions sharing a common axis, the three cylindrical portions having first, second and third diameters in descending order of magnitude respectively, forming thereby a first shoulder between the first and second portions, and a second shoulder between the second and third portions, and a first end and a second end both orthogonal to the common axis with the first end at the first portion and the second end at the third portion;
    a cavity coaxial with the common axis formed in the first cylindrical portion from the first end, the cavity for accepting a laser pointer device; and
    a laser pointer constrained in the cavity such that the laser, when activated, projects along the common axis of the cylindrical portions;
    characterized in that the device, inserted by the second end in a first circular opening of a fourth diameter smaller than the fist diameter and larger than the second diameter, or inserted by the first end in a second circular opening of a fifth diameter smaller than the second diameter and larger than the third diameter, will cause the laser pointer to project along the axis of either opening.

2. The projector of claim 1 further comprising a switch for activating the laser pointer.

3. The projector of claim 2 wherein the switch is a push-button switch.

4. The projector of claim 3 further comprising a flexible, sealable cover for the pushbutton switch.

5. In a construction process, a method for projecting the axis of a cylindrical opening in a first member onto a second member, comprising the steps of:

(a) positioning a laser projector with a body having first, second and third cylindrical portions sharing a common axis, the three cylindrical portions having first, second and third diameters in descending order of magnitude respectively, forming thereby a first shoulder between the first and second portions, and a second shoulder between the second and third portions, and a first end and a second end both orthogonal to the common axis with the first end at the first portion and the second end at the second portion and a cavity coaxial with the common axis formed in the first cylindrical portion from the first end, the cavity constraining a laser pointer device, inserting the laser projector by the second end into the cylindrical opening;

(b) activating the laser pointer so that the laser projects along the axis of the opening of the first member onto the second member; and (c) marking the position of the laser projecting on the remote member.

6. The method of claim 5 wherein the first member is a plumbing fixture.

7. The method of claim 5 wherein the first member is a construction member having a circular opening.

8. The method of claim 5, wherein, in step (b), the laser pointer is activated by an on-off switch.

9. The method of claim 8 wherein the switch is a push-button switch.

10. The method of claim 9, wherein the switch is protected by a flexible, sealable cover.

11. A center-point projector for determining location for alignment, comprising:

a body having first, second and third cylindrical portions sharing a common axis, the three cylindrical portions having first, second and third diameters in descending order of magnitude respectively, forming thereby a first shoulder between the first and second portions, and a second shoulder between the second and third portions, and a first end and a second end both orthogonal to the common axis with the first end at the first portion and the second end at the second portion;

a gravity-activated vertical-seeking mechanism mounted in the body; and a laser pointer mounted in the vertical-seeking mechanism;

wherein the vertical-seeking mechanism causes the laser pointer, when activated, to seek to point vertically in the direction of action of gravity.

12. The projector of claim 11 wherein the vertical-seeking mechanism is a double-pivoted gimbal mechanism, weighted to seek a vertical aspect.

13. In a construction process involving plural members of an assembly, a method for projecting the axis of an opening in a first member onto a second member, comprising steps of:

(a) positioning a laser projector with a body having at least a first cylindrical portion with a first diameter ending in a shoulder, a vertical-seeking mechanism mounted in the body, and a laser pointer mounted in the vertical-seeking mechanism, in an opening of a pipe element, the opening directed generally upward; and (b) on a stationary surface above the projector, marking a point the laser pointer illuminates s a result of the vertical-seeking mechanism causing the laser pointer to be directed vertically.

* * * * *